United States Patent [19]

Bondanini

[11] Patent Number: 4,650,583

[45] Date of Patent: Mar. 17, 1987

[54] INFUSION FILTER

[76] Inventor: Failiero Bondanini, 2, rue Etraz, 1003 Lausanne, Switzerland

[21] Appl. No.: 758,345

[22] Filed: Jul. 24, 1985

[30] Foreign Application Priority Data

Nov. 19, 1984 [FR] France ............................ 84 17608

[51] Int. Cl.$^4$ ............................................. B01D 25/08
[52] U.S. Cl. ................... 210/474; 210/479; 210/481; 99/297
[58] Field of Search ............... 99/287, 297, 323, 292, 99/284; 210/469, 473, 474, 477, 478, 479, 480, 481, 482, 495

[56] References Cited

U.S. PATENT DOCUMENTS

| 2,211,486 | 8/1940 | Zoia | 99/287 |
| 2,864,504 | 12/1958 | Jepson | 210/481 |
| 2,878,940 | 3/1959 | Jepson | 210/481 |
| 2,900,896 | 8/1959 | Bondanini | 99/287 |
| 3,137,228 | 6/1964 | Elow | 99/287 |
| 3,307,474 | 3/1967 | Kasher | 99/287 |
| 3,927,608 | 12/1975 | Doyel | 99/287 |

FOREIGN PATENT DOCUMENTS

| 74757 | 5/1893 | Fed. Rep. of Germany | 99/287 |
| 1134000 | 4/1957 | France | |
| 1377528 | 9/1963 | France | |
| 1527501 | 4/1968 | France | |
| 2300532 | 9/1976 | France | |
| 519595 | 4/1940 | United Kingdom | 99/287 |

Primary Examiner—Benoît Castel
Assistant Examiner—Wanda L. Millard
Attorney, Agent, or Firm—Sandler & Greenblum

[57] ABSTRACT

This invention relates to an infusion filter, in particular for use in coffee percolators, which includes a first rigid disc having an open space therein and a second rigid disc having an open space therein. The infusion filter includes a filter element having an inclined edge and a circular part having an open space therein. The filter element and the circular part are disposed between the first and second discs. The inclined edge of the filter element abuts the inclined edge of the circular part. The first and second rigid disc are molded such that the inclined edge of the filter element and the inclined edge of the circular part extend beyond the discs.

17 Claims, 3 Drawing Figures

INFUSION FILTER

BACKGROUND OF THE INVENTION

1. Field of the Invention

The present invention relates to a coffee filter.

2. Description of Background Information

The coffee filter unit of the present invention is for use in infusers and percolators generally, particularly for coffee percolators or infusers which have a cylindrical body fitted with a cover. The cover includes a central hole. The percolator includes a piston which includes a filter unit which is filled on a rod positioned in the center of the body. The rod is inserted through the center hole of the cover. The filter slides vertically with the rod within the body. The filter unit is liquid permeable and includes a filter.

The body of a coffee percolator of this kind is generally made of glass and is located in a support which has a handle. Because of the type of material used for the body, allowance must be made for comparatively ample tolerances. The filter unit has to be freely slidable. The filter unit must also be capable of conforming itself to variations in the internal shape of the body without allowing the coffee, usually in the form of a fine powder, to move past it, as the rod with the filter on it is reciprocated.

In order to satisfy the above conditions, complex and expensive filters have been designed which include a number of parts which must be dismantled for cleaning purposes.

SUMMARY OF THE INVENTION

According to one characteristic of the present invention, a filter unit is provided for use in percolators, including a first rigid disc having an open space therein, a second rigid disc having an open space therein, a filter element having an inclined edge, and at least one circular part having an open space therein applied against the filter element. The filter element and the at least one circular part are disposed between the first and second rigid discs. The inclined edge of the filter element abuts the inclined edge of the at least one circular part. The first and second rigid discs are molded such that the inclined edge of the filter element and the inclined edge of the at least one circular part extend beyond the discs.

The filter element is made of a piece of wire cloth, or a piece of synthetic gauze. The filter unit is used in combination with a coffee percolator of the type having a cylindrical body and a cover. The cover includes a central hole which is adapted to receive a sliding rod inserted therein. The sliding rod is adapted to be screwed onto the filter unit.

The inclined edge of the at least one circular part consists of a plurality of flexible tongues, which are T-shaped, and have an enlarged free end.

The first rigid disc includes a central head. The filter element also includes a stud attached to a first face of the central head, and a first ring. The stud passes through the filter element and the first ring is secured to the stud such that the first rigid disc is positioned on one side of the filter element and the first ring is positioned on another side of the filter element.

The first rigid disc consists of a second ring having an internal diameter and one face which abuts one side of the at least one circular part. The first rigid disc includes a plurality of radial branches which extend from the central head and have free ends which are integral with the second ring. The at least one circular part is made of metal and consists of a third ring having an internal diameter which is substantially equal to the internal diameter of the second ring, and the second rigid disc consists of a fourth ring having an internal diameter which is substantially equal to the internal diameter of the second and third rings.

The face of the second ring which interacts with the one side of the at least one circular part and the first face of the central head are situated in the same plane. The plurality of branches are staggered in height with respect to that plane. The plurality of radial branches have a T-shaped cross-section.

The fourth ring includes a plurality of studs or pegs disposed on a face of the fourth ring which faces the filter element. The third ring includes a plurality of notches which correspond to the plurality of pegs and the second ring includes a plurality of holes disposed on the face which abuts the one side of the at least one circular part. The holes are adapted to accommodate the plurality of pegs.

According to a second characteristic of the invention, an infusion filter is provided for use in coffee percolators which includes a first ring having an internal diameter, a second ring having an internal diameter which is substantially equal to the internal diameter of the first ring, a third ring having an internal diameter which is substantially equal to the internal diameter of the first and second rings, and a filter element for filtering a substance. The filter element is disposed between the third and second rings and the second ring is disposed between the filter element and the first ring.

The first ring has a plurality of radial branches which connect the central head to the first ring, and a plurality of holes disposed on a side of the first ring which faces the second ring. The second ring consists of an internal edge, an inclined, external edge, a plurality of flexible tongues disposed on the inclined external edge, and a plurality of notches located on the internal edge. The filter element consists of an inclined, external edge and a plurality of holes. The third ring includes a plurality of pegs disposed on a side of the third ring which abuts the filter element. The plurality of pegs extend from the third ring, through the plurality of holes of the filter element and the plurality of notches of the second ring and into the holes of the first ring.

BRIEF DESCRIPTION OF THE DRAWINGS

The invention will now be described in greater detail with reference to one particular embodiment given solely by way of example, and illustrated in the accompanying drawings, in which.

DETAILED DESCRIPTION OF THE PREFERRED EMBODIMENTS

Figure 1:
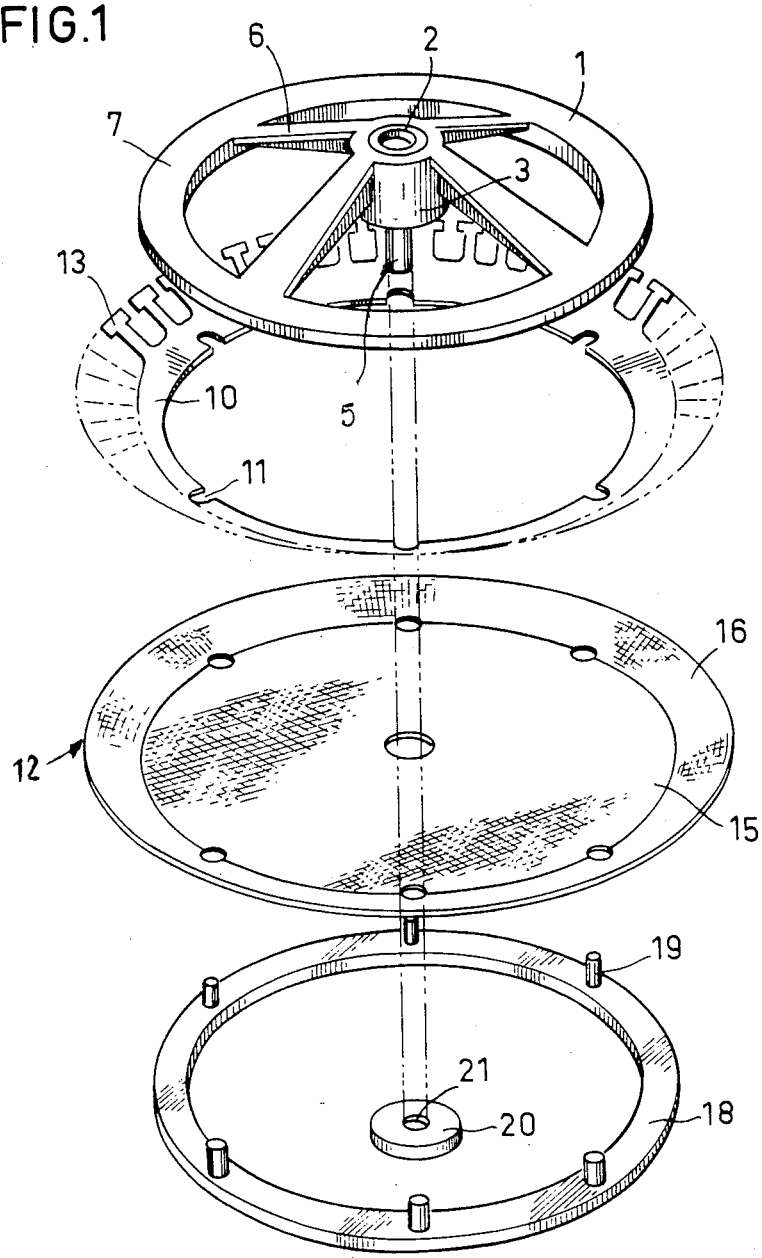
FIG. 1 is an exploded view of a filter unit in accordance with the present invention.

It is an object of the present invention to provide a filter unit which is simple to manufacture and less expensive than those of the prior art.

It is another object of the present invention to provide a simple filter unit which ensures faultless operation.

The filter unit, according to the present invention, is designed for use with a coffee percolator which has a cylindrical body and a cover. The cover includes a guide hole for a sliding rod which is constructed to be attached to the filter unit. The filter unit is movable within the body by means of the sliding rod and includes a filter. The filter unit comprises a filter element, such as a piece of wire cloth or synthetic gauze, which is gripped between two rigid discs, which are perforated or have an open space therein. At least one circular part is applied against the filter element. The at least one circular part is perforated or has an open space therein and includes an inclined edge. The inclined edge is cut in such a way as to provide elastic, or flexible tongues. The rigid discs are molded in such a manner so as to include, positioned between them, the circular metallic part and the filter element. The filter unit is characterized in that the filter element has an inclined edge which interacts with the elastic tongues. The rigid discs are molded so that the inclined edge of the filter element and the elastic tongues are left free.

This system provides a filter unit which is in one single piece. The filter unit has flexible or elastic edges, so that it can slide satisfactorily along the inner wall of the cylindrical body, and be able to adapt itself to even the smallest irregularities and reliably block the passage of the coffee powder.

The elastic tongues are preferably T-shaped and terminate in an enlarged end.

According to one characteristic of the present invention, the face of the filter unit, which is opposite to the face designed to be attached to the filter unit is provided with a stud designed to pass through the fabric and secured to a ring on the other side of the fabric. The filter unit has radial branches of which the free ends are integral with the ring which forms one of the rigid discs. The radial branches are designed to bear against the corresponding face of the circular part having T-shaped tongues. The circular part is shaped in such a way so as to form a ring having substantially the same internal diameter as the ring integral with the aforementioned branches. The second perforated disc consists of an additional ring of the same internal diameter as the other two rings.

This arrangement provides a very ample filter cloth area and facilitates the entry of the filter unit into the body of the coffee pot.

According to one characteristic of the present invention, the face of the ring which is designed to interact with the ring having elastic tongues and the face of the filter unit which is provided with the stud are situated in one and the same plane and the radial branches are staggered in height in relation to that plane. This design provides a perfectly flat filter. The design also allows for a considerably large filtering area and an easy cleaning operation.

The radial branches preferably have a T-shaped cross section.

An additional ring is provided with studs on the side facing towards the fabric. The ring with elastic tongues has notches which correspond to the studs. The corresponding face of the ring integral with the free ends of the branches is provided with holes to accommodate the studs. The various elements can thus be correctly positioned in advance and secured by heat or ultrasonic welding.

Figure 2:
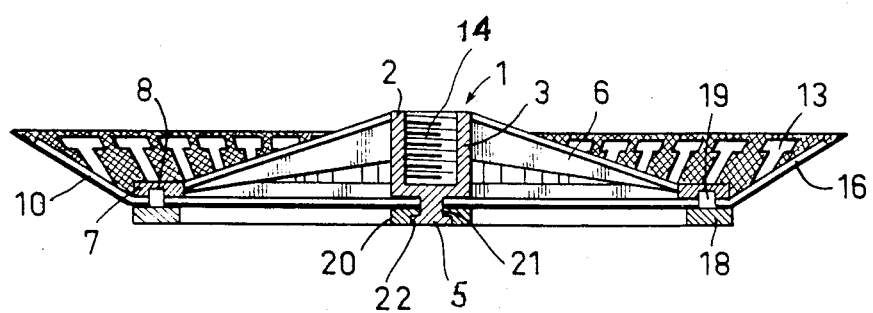
FIG. 2 is a sectional view taken along a plane passing through the axis of the filter unit.

Infusion filter 24, as seen in FIGS. 1 and 2, comprises first disc 1 including central head 3. Central head 3 includes nut 2 having an upper and a lower face. Threading 4 of nut 2 is open towards the upper face of nut 2. The lower face of nut 2 is provided with central stud 5.

Head 3 is integrally connected to four radial branches 6. Each of the four radial branches 6 has a free end which is integral with ring 7. Each branch 6 is of T-shaped cross section and extends from the upper edge of head 3 to the upper edge of ring 7. The lower edge of ring 7 is situated in the same plane as the lower edge of head 3.

Ring 7 comprises a plurality of holes 8 which are spaced from each other by an equal angular distance, as best shown in FIG. 2. Holes 8 open onto the lower face of ring 7.

The filter element comprises a piece of fabric 12, e.g., a fine-meshed wire cloth or, as best seen in FIG. 1, a piece of fabric of synthetic material 15 having inclined edge 16.

The circular metallic part comprises ring 10, preferably made of plated steel and includes a plurality of peripheral tongues 13. Each tongue 13 is in the shape of a T, and is integrally attached to ring 10 as shown in FIG. 1. Ring 10 comes to rest against fabric 15. The cross piece of the T forms the free end of each tongue.

Tongues 13 are inclined in such a way as to adapt themselves to the incline of edge 16 of the filter fabric 12.

Ring 10 includes a plurality of notches 11 along its internal edge. Notches 11 are spaced by equal angular spacings which correspond to the distance between the plurality of holes 8.

The second rigid disc comprises ring 18, which includes one face having a plurality of studs 19 which are designed to interact with the plurality of notches 11 and engage the plurality of holes 8.

Stud or lug 5 is configured to enter hole 21 of ring 20. Hole 21 terminates in flare 22, shown in FIG. 2, which is designed to accommodate a head belonging to lug 5. The head of lug 5 is formed by a compression or a hot shaping process.

As may be seen in FIGS. 1 and 2, fabric 15 rests on that surface of ring 18 which includes studs or pegs 19. Ring 10 rests on fabric 15. First disc 1 comes to rest on ring 10 by means of ring 7. The plurality of studs 19 enter the plurality of holes 8, while stud 5 passes through fabric 15 and enters hole 21 of ring 20.

Rings 18 and 7 are welded together by a hot welding or ultrasonic process, thus providing a one piece, package-type filter unit.

Because branches 6 are positioned at a distance from filter fabric 12, the filter surface is of ample size.

Figure 3:
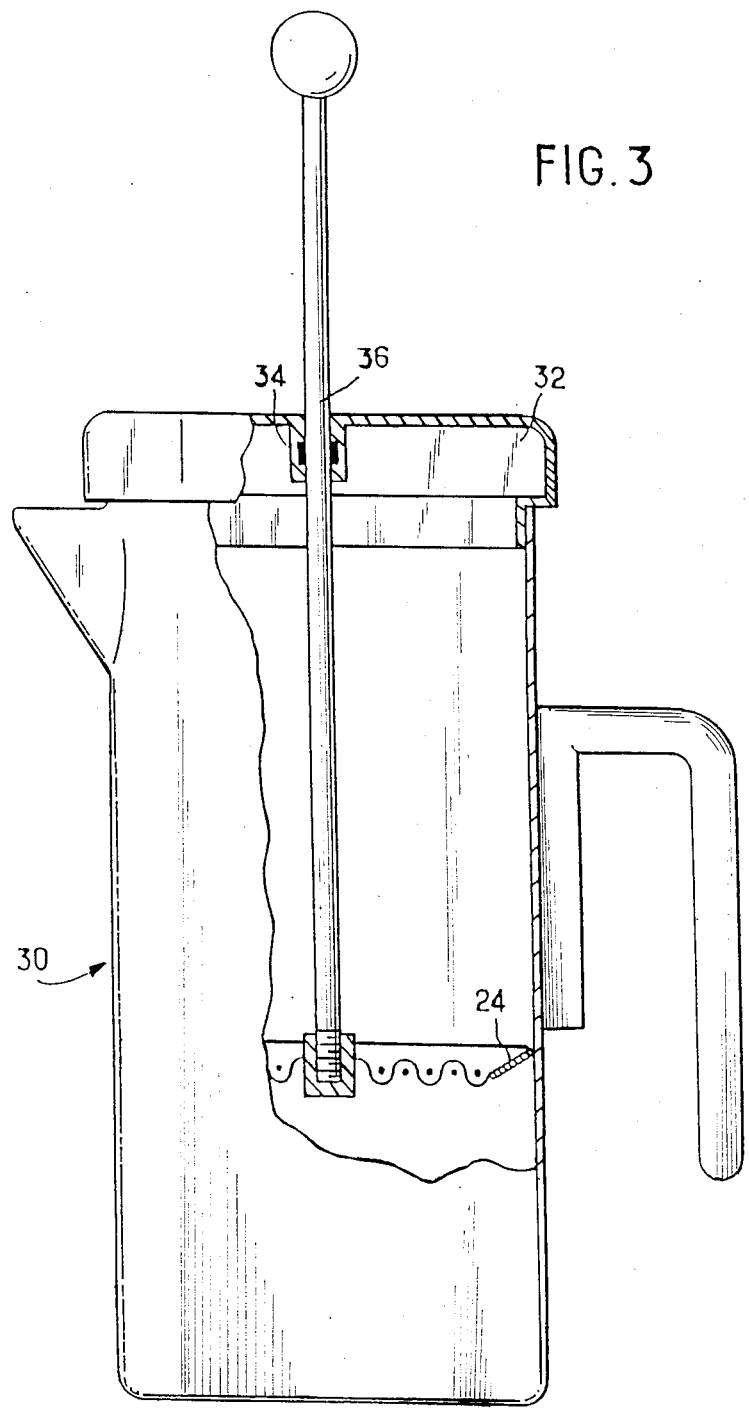
FIG. 3 is a sectional view of a coffee pot in which the filter unit of FIGS. 1 and 2 is to be used.

Filter unit 24 is designed to be used in particular with coffee makers as shown in FIG. 3 which consist of glass pot 30 and cover 32. Cover 32 includes central hole 34 through which sliding rod 36 is inserted. The end portion of rod 36 is threaded and is adapted to be screwed into threads 4 of filter unit 24.

The filter unit is used as follows. Coffee grinds are placed into pot 30 and then hot water is poured into pot 30. Filter unit 24 is screwed onto rod 36, which had previously been inserted into central hole 34 of cover 32. Then filter unit 24 is pushed through pot 30 towards the bottom, by means of sliding rod 36. The water, now coffee, filters up through the filter, while the grounds are kept on the bottom of the pot, under filter unit 24. The user repeatedly pushes down and pulls up on sliding rod 36, causing a reciprocating sliding movement of filter unit 24. The movement causes extraction of solubles from the coffee grinds, while the grinds are kept separated from the water by filter unit 24.

Although the invention has been described with reference to particular means, methods, and embodiments, it is to be understood that the invention is not confined to the embodiment described in the foregoing and illustrated herein, but extends to all equivalents within the scope of the claims.

What is claimed is:

1. A filter unit for use in percolators, comprising:
   a. a first ring;
   b. a first rigid disc having an open space therein, said first rigid disc comprising a second ring, a plurality of radial branches, and a central head having a first face;
   c. second rigid disc having an open space therein;
   d. a filter element having an inclined edge; and
   e. at least one circular part having an open space therein applied against said filter element, wherein said filter element and said at least one circular part are disposed between said first and second rigid discs, said inclined edge of said filter element abutting said inclined edge of said at least one circular part and said first and second rigid discs being molded such that said inclined edge of said filter element and said inclined edge of said at least one circular part extend beyond said discs, wherein said second ring comprises a first face which abuts one side of said at least one circular part and said first face of said second ring which interacts with said one side of said at least one circular part and said first face of said central head are situated in the same plane, and said plurality of branches are staggered in height with respect to said plane.

2. The filter unit according to claim 1 wherein said filter unit further comprises
   a stud attached to said first face of said central head and
   a first ring wherein said stud passes through said filter element and said first ring is secured to said stud such that said first rigid disc is positioned on one side of said filter element and said first ring is positioned on another side of said filter element.

3. The filter unit according to claim 2, wherein:
   a. said second ring has an internal diameter;
   b. said plurality of radial branches extend from said central head and have free ends which are integral with said second ring;
   c. said at least one circular part is made of metal and comprises a third ring having an internal diameter which is substantially equal to the internal diameter of said second ring; and
   d. said second rigid disc comprises a fourth ring having an internal diameter which is substantially equal to the internal diameter of said second and third rings.

4. The filter unit according to claim 3, wherein said plurality of radial branches have a T-shaped cross-section.

5. The filter unit according to claim 3 wherein:
   a. said fourth ring comprises a plurality of studs disposed on a face of said fourth ring which faces said filter element;
   b. said third ring comprises a plurality of notches which correspond to said plurality of studs; and
   c. said second ring comprises a plurality of holes disposed on said face which abuts said one side of said at least one circular part, said holes being adapted to accommodate said plurality of studs.

6. The filter unit according to claim 1 wherein said inclined edge of said at least one circular part comprises a plurality of flexible tongues.

7. The filter unit according to claim 6 wherein said plurality of flexible tongues are T-shaped, and have an enlarged free end.

8. The filter unit according to claim 1 wherein said filter element is made of a piece of wire cloth.

9. The filter unit according to claim 1 wherein said filter element is made of a piece of synthetic gauze.

10. The filter unit according to claim 1 in combination with a coffee percolator of the type having a cylindrical body and a cover which includes a central hole, said central hole being adapted to receive a sliding rod inserted therein, said sliding rod being adapted to be screwed onto said filter unit.

11. An infusion filter for use in coffee percolators comprising:
    a. a first ring having an internal diameter;
    b. a second ring having an internal diameter which is substantially equal to said internal diameter of said first ring, said second ring comprising an internal edge, an inclined, external edge, a plurality of flexible tongues disposed on said inclined external edge, and a plurality of notches located on said internal edge;
    c. a third ring having an internal diameter which is substantially equal to said internal diameter of said first and second rings;
    d. a filter element for filtering a substance, wherein said filter element is disposed between said third and second rings and said second ring is disposed between said filter element and said first ring; and
    e. a central head and wherein said first ring comprises a plurality of radial branches which connect said central head to said first ring, and a plurality of holes disposed on a side of said first ring which faces said second ring.

12. The infusion filter according to claim 11, wherein said filter element comprises an inclined, external edge and a plurality of holes.

13. The infusion filter according to claim 11, wherein said third ring comprises a plurality of pegs disposed on a side of said third ring which abuts said filter element, said plurality of pegs extending from said third ring, through said plurality of holes of said filter element and said plurality of notches of said second ring and into said holes of said first ring.

14. A filter unit for use in percolators, comprising:
    a. a first ring;
    b. a first rigid disc having an open space therein, said first rigid disc comprising:
       1. a central head;
       2. a second ring having an internal diameter and one face which abuts one side of said at least one circular part; and
       3. a plurality of radial branches which extend from said central head and have free ends which are integral with said second ring;
    c. a second rigid disc having an open space therein;
    d. a filter element having an inclined edge;
    e. a stud attached to a first face of said central head, said stud passing through said filter element and said first ring being secured to said stud such that said first rigid disc is positioned on one side of said filter element and said first ring is positioned on another side of said filter element;

f. at least one circular part having an open space therein applied against said filter element, wherein said filter element and said at least one circular part are disposed between said first and second rigid discs, said inclined edge of said filter element abutting said inclined edge of said at least one circular part and said first and second rigid discs being molded such that said inclined edge of said filter element and said inclined edge of said at least one circular part extend beyond said discs, wherein said at least one circular part is made of metal and comprises a third ring having an internal diameter which is substantially equal to the internal diameter of said second ring, and said second rigid disc comprises a fourth ring having an internal diameter which is substantially equal to the internal diameter of said second and third rings and wherein said face of said second ring which interacts with said one side of said at least one circular part and said first face of said central head are situated in the same plane, and said plurality of branches are staggered in height with respect to said plane.

15. An infusion filter for use in coffee percolators comprising:
    a. a first ring having an internal diameter;
    b. a second ring having an internal diameter which is substantially equal to said internal diameter of said first ring, said second ring comprising an internal edge, and inclined, external edge, a plurality of flexible tongues disposed on said inclined external edge and a plurality of notches located on said internal edge;
    c. a third ring having an internal diameter which is substantially equal to said internal diameter of said first and second rings; and
    d. a filter element for filtering a substance, wherein said filter element is disposed between said third and second rings and said second ring is disposed between said filter element and said first ring.

16. The infusion filter according to claim 15, wherein said infusion filter comprises a central head and said first ring comprises a plurality of radial branches which connect said central head to said first ring, and a plurality of holes disposed on a side of said first ring which faces said second ring.

17. The infusion filter according to claim 16 wherein
    a. said filter element comprises an inclined, external edge and a plurality of holes; and
    b. said third ring comprises a plurality of pegs disposed on a side of said third ring which abuts said filter element, said plurality of pegs extending from said third ring, through said plurality of holes of said filter element and said plurality of notches of said second ring and into said holes of said first ring.

* * * * *

UNITED STATES PATENT AND TRADEMARK OFFICE
CERTIFICATE OF CORRECTION

PATENT NO. : 4,650,583

DATED : March 17, 1987

INVENTOR(S) : Faliero Bondanini

It is certified that error appears in the above-identified patent and that said Letters Patent is hereby corrected as shown below:

On the title page of the printed patent, paragraph (76) "Failiero" should read -- Faliero --.

Signed and Sealed this

Tenth Day of May, 1988

Attest:

DONALD J. QUIGG

Attesting Officer

Commissioner of Patents and Trademarks